(12) United States Patent
Uno

(10) Patent No.: US 6,494,526 B2
(45) Date of Patent: Dec. 17, 2002

(54) CONSOLE BOX MOUNTING STRUCTURE OF VEHICLE

(75) Inventor: Masataka Uno, deceased, late of Ishikawa (JP), by Yuriko Uno, heir

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 09/990,271

(22) Filed: Nov. 23, 2001

(65) Prior Publication Data

US 2002/0070585 A1 Jun. 13, 2002

(30) Foreign Application Priority Data

Dec. 8, 2000 (JP) ........................................ 2000-374208

(51) Int. Cl.⁷ ............................................. B62D 33/06
(52) U.S. Cl. ..................................... 296/190.08; 296/70
(58) Field of Search .................... 296/190.01, 190.08, 296/70, 72; 180/89.12, 90

(56) References Cited

U.S. PATENT DOCUMENTS

| | | | |
|---|---|---|---|
| 3,946,826 A | * | 3/1976 | Guhl et al. |
| 4,126,202 A | * | 11/1978 | Hern ........................ 180/89.12 |
| 4,372,410 A | * | 2/1983 | Loken et al. ............ 180/89.12 |
| 4,669,564 A | * | 6/1987 | Kreutz ..................... 180/89.12 |
| 5,082,078 A | * | 1/1992 | Umeda et al. ............ 296/70 X |
| 6,260,914 B1 | * | 7/2001 | Nieminski et al. ..... 296/190.08 |

FOREIGN PATENT DOCUMENTS

JP 5-178236 * 5/1993

* cited by examiner

*Primary Examiner*—Joseph D. Pape
(74) *Attorney, Agent, or Firm*—Varndell & Varndell, PLLC

(57) ABSTRACT

The invention provides a console box mounting structure which can use a common console box and parts for mounting the same between an operator cab equipped specification and an operator cab non-equipped specification. In a mounting structure of a console box in a vehicle, there are provided with an instrument panel provided with an electrical measuring instrument and a start switch for the vehicle, and the instrument panel being (6) placed in the console box (25), a common console box mounting structure is provided on a partition wall (16) sectioning an engine room (15) and an operator cab in the vehicle, and a front surface wall (31) of the operator cab (30) provided in the vehicle, an add-on mounting portion capable of commonly being mounted to the partition wall (16) and the front surface wall (31) of the operator cab (30) in an add-on manner is provided in the console box, and one console box (25) is selectively mounted to the partition wall (16) and the front surface wall (31) of the operator cab (30).

2 Claims, 5 Drawing Sheets

CONSOLE BOX MOUNTING STRUCTURE OF VEHICLE

BACKGROUND OF THE INVENTION

1. Field of the Invention

The present invention relates to a mounting structure of a console box in which an instrument panel is placed, in a construction vehicle such as a bulldozer or the like.

2. Description of the Prior Art

A conventional bulldozer is shipped from the factory on the basis of any one of a specification that a cab (hereinafter, refer to an operator cab) is not equipped as shown in FIG. 3 (hereinafter, refer to an operator cab non-equipped specification) and a specification that the operator cab is equipped as shown in FIG. 4 (hereinafter, refer to an operator cab equipped specification) in accordance with a desired specification from a customer side, however, an instrument panel in which a vehicle body measuring instrument, an engine start switch and the like are arranged has different mounting structures between both of the specifications.

That is, a construction vehicle 10 on the basis of the operator cab non-equipped specification shown in FIG. 3 is structured such that an engine room 1 having an engine built-in is mounted in a front side of an upper portion of a vehicle body frame having a traveling body 2 such as a crawler belt or the like, and an operator seat 5 is attached onto a floor 4 mounted to the vehicle body frame at the rear of the engine room 1. A console box 9 in which an instrument panel 6 is placed is attached to a partition wall 16a provided in a rear end portion of the engine room 1. Further, in a construction vehicle 10 on the basis of the operator cab equipped specification shown in FIG. 4, an operator cab 7 is mounted on a floor 4a exclusively used for mounting the operator cab and a console box 9a with an instrument panel 6a for being mounted exclusively to the operator cab is mounted to a front surface wall 7a of the operator cab 7, or a console oanel mounting table 8 in which an Instrument panel 6b is placed is put on the floor 4a exclusively used for mounting the operator cab. The other parts denoted by the other reference symbols than those mentioned above are the same as those in FIG. 3, and a description thereof will be omitted.

Further, as the other conventional embodiment in the case of the operator cab equipped specification, as shown in FIG. 5, there is a structure in which a substantially center portion of a front surface wall 7a of the operator cab is notched in a shape extending along a periphery of a surrounding wall 1a in the engine room 1, and the operator cab 7 is put from the above so that a notched portion 7b is displaced along an outer peripheral surface of the engine room 1, thereby being mounted to the floor 4. In this case, the common console box 9 in which the instrument panel is placed is used between both of the specifications mentioned above.

However, in the mounting structure of the console box in accordance with the conventional art, the following problems are generated.

(1) In the first prior art, In the case of changing from the operator cab non-equipped specification to the operator cab equipped specification on the basis of the desire of the customer side after shipping the construction vehicle, or in the case of charging from the operator cab equipped specification to the operator cab non-equipped specification, it is necessary to take out the instrument panel 6 or 6a in accordance with one specification so as to replace by the instrument panel 6a or 6 in correspondence to the specification after being modified, a high cost of the parts is required and a long time for preparing the parts is required, so that there is a problem that a cost for this modification is increased.

(2) Further, in the first prior art, since the instrument panels 6a and 6 and the mounting structure thereof are different between the operator cab equipped specification and the operator cab non-equipped specification, it is impossible to commonly use the panel and the parts for mounting, and there is a problem that a manufacturing cost is increased.

(3) In the second prior art, a seal member such as a packing or the like is provided in a gap between the notch portion on the front surface wall 7a of the operator cab 7 and the outer peripheral surface of the engine room 1, however, when a sealing performance thereof is not sufficient or is deteriorated, a sealing performance within the operator cab is reduced, so that there is a problem that an air conditioning performance performed by an air conditioner and a dust proof performance are reduced and an interior comfort is deteriorated due to an intrusion of sound or the like.

SUMMARY OF THE INVENTION

The present inventIon is made by taking the conventional problems mentioned above into consideration, and an object of the present invention is to provide a console box mounting structure which can use a common console box and parts for mounting the same between an operator cab equipped specification and an operator cab non-equipped specification.

In order to achieve the object mentioned above, in accordance with a first aspect of the present invention, there is provided a mounting structure of a console box with an instrument panel provided with an electrical measuring instrument and/or a start switch for a vehicle, wherein the console box mounting structure has a common structure with which the console box is selectively mounted to a partition wall sectioning an engine room and an operator seat in a vehicle without an operator cab, and a front surface wall of the operator cab provided in a vehicle with an operator cab.

Further, in accordance with a second aspect of the present invention, there is provided a mounting structure of a console box as recited in the first aspect, wherein said partition wall and the front surface wall of the vehicle have a through hole.

In accordance with the structure mentioned above, since the console box commonly used between both of the specifications having the instrument panel placed can be mounted to a surface opposing to an operator seat in the partition wall of the engine room in the case of the specification provided with no operator cab, and to the front surface wall of the operator cab in the case of the specification equipped with the operator cab, it is possible to commonly use the console box and a manufacturing cost can be reduced. Further, in the case that the specification is changed between the operator cab non-equipped specification and the operator cab equipped specification after being shipped from the factory, the parts have no waste since only the operator cab is prepared, and a replacing operation can be easily performed only by replacing the console box having the instrument panel placed between the partition wall and the front surface wall of the operator cab, so that it is possible to reduce a cost of changing the specification. Further, since it is not necessary that the notch portion for riding over the engine room is provided on the front surface wall of the operator cab as in the conventional art, it is easy to secure a sealing performance of the operator cab and it is possible to securely improve an interior comfort of the operator cab.

Further, since the through hole on the partition wall of the engine room and the through hole on the front surface wall of the operator cab are pierced at the position aligning with each other, whereby it is possible to mount by the same mounting means by using the same instrument panel without relation to the specifications with and without the operator cab and it is possible to arrange the wiring cable from the instrument panel via the common through hole on the partition wall of the engine chamber and the through hole on the front surface wall of the operator cab, it is possible to commonly use the parts such as the instrument panel, the mounting means and the like, so that it is possible to reduce a manufacturing cost, it is possible to improve an operability at a time of changing the specification and it is possible to reduce a changing cost.

DESCRIPTION OF THE PREFERRED EMBODIMENT

Figure 3:
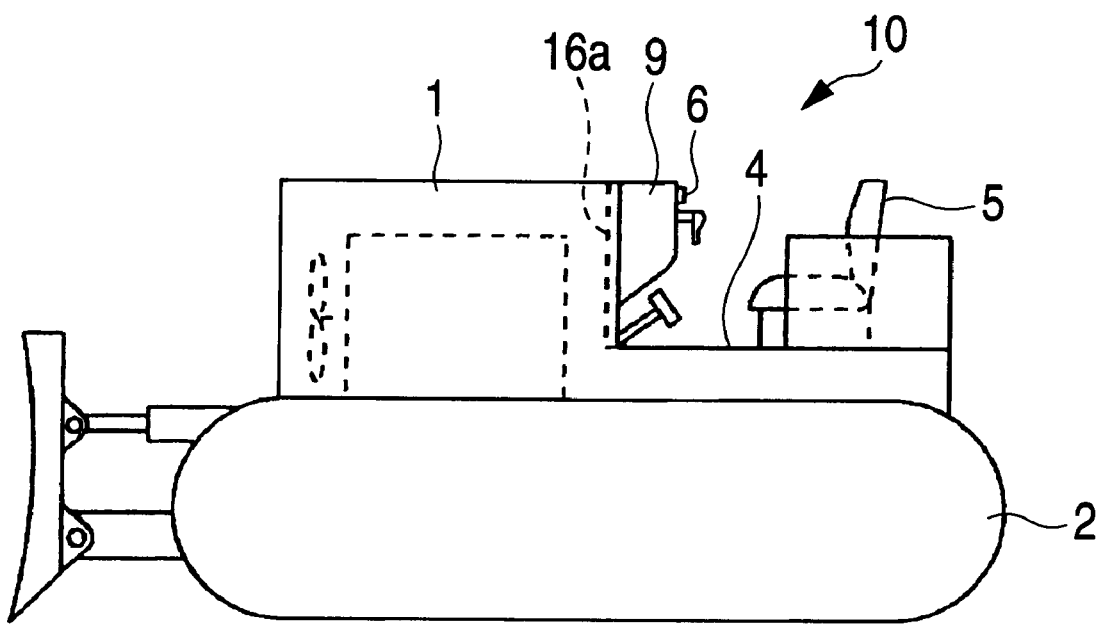
FIG. 3 is a schematic view of a console box mounting structure on the basis of an operator cab non-equipped specification in accordance with a conventional art.
Figure 4:
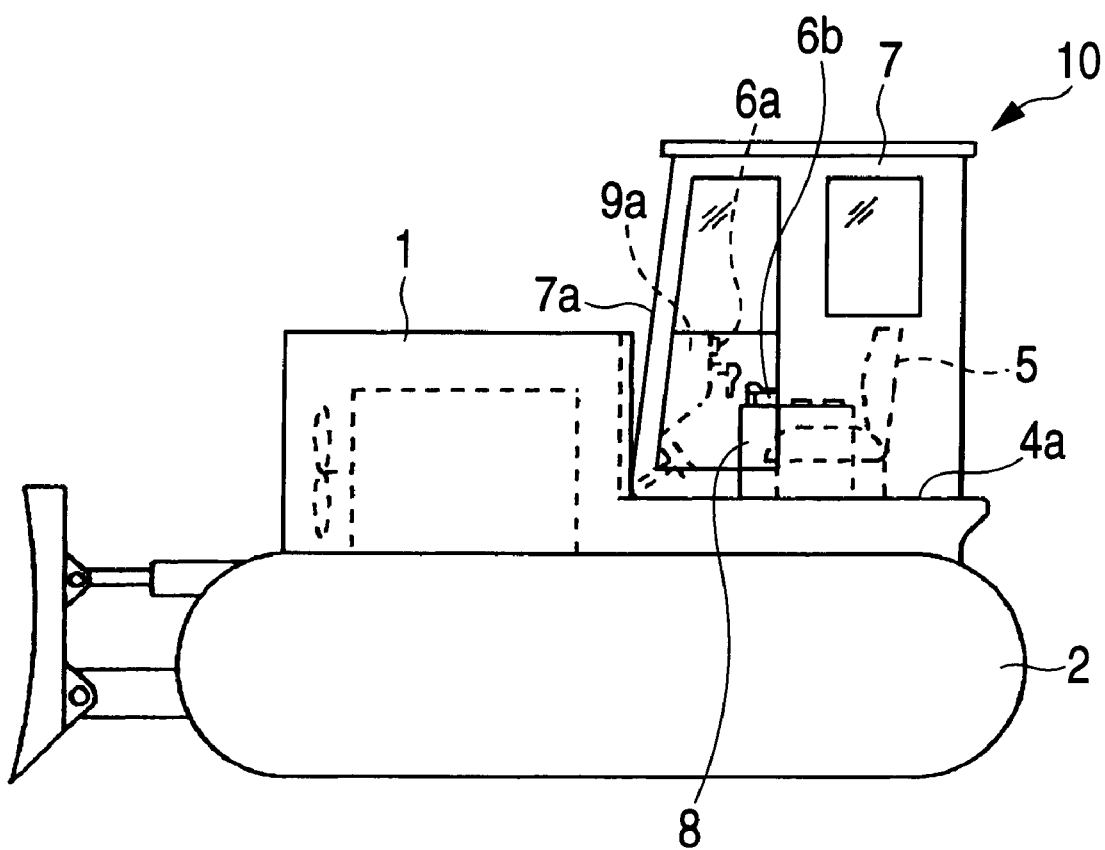
FIG. 4 is a schematic view of a console box mounting structure on the basis of an operator cab equipped specification in accordance with the conventional art.
Figure 5:
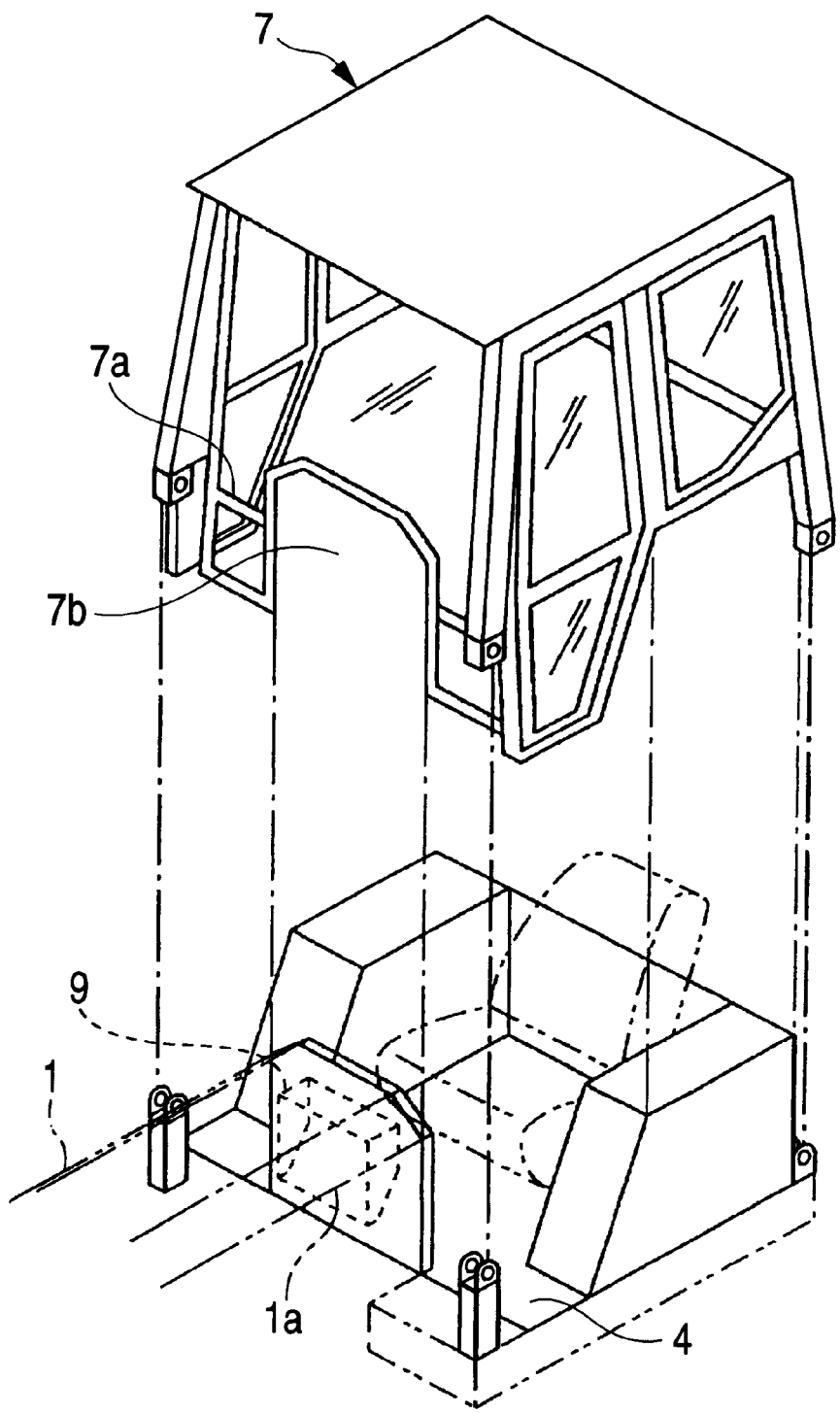
FIG. 5 is a schematic view of a console box mounting structure on the basis of an operator cab equipped specification in accordance with another embodiment of the conventional art.

A description will be given below of an embodiment of a console box mounting structure in accordance with the present invention on the bases of FIGS. 1 and 2 with reference to FIGS. 3 and 4.

At first, a description will be given of a console box mounting structure in a construction vehicle in accordance with an operator cab non-equipped specification, on the basis of FIG. 1. In FIG. 1, a partition wall 16 is mounted to a rear end portion of an engine room 15 by a fastening means 17 such as a bolt or the like, and a console box 25 in which an instrument panel 6 provided with an electric measuring instrument, a start switch 26 and the like is placed is mounted to the partition wall 16. The console box 25 has a bracket 19, and is detachably attached to the partition wall 16 via the bracket 19 by mounting means 20 and 21 such as bolts or the like. Further, a through hole 24 is pieced on the partition wall 16, and a grommet 22 is fitted and attached to the through hole 24. A cable 23 obtained by collecting and combining a plurality of electric wires connected to the instrument panel 6 is inserted into the grommet 22, and the cable 23 is fixed to a side of the engine room of the partition wall 16 by a fixing means 18 so as not to move, and is connected to a connection connector 27 arranged in a lower portion within the engine room 15. In this case, the connection connector 27 is connected to a starter motor, a controller (not shown) or the like.

Next, a description will be given of a console box mounting structure in a construction vehicle in accordance with a driver's cabin equipped specification on the basis of FIG. 2. In this case, the elements having the same reference numerals in FIG. 1 correspond to the same elements in FIG. 1, and a description thereof will be omitted.

Figure 2:
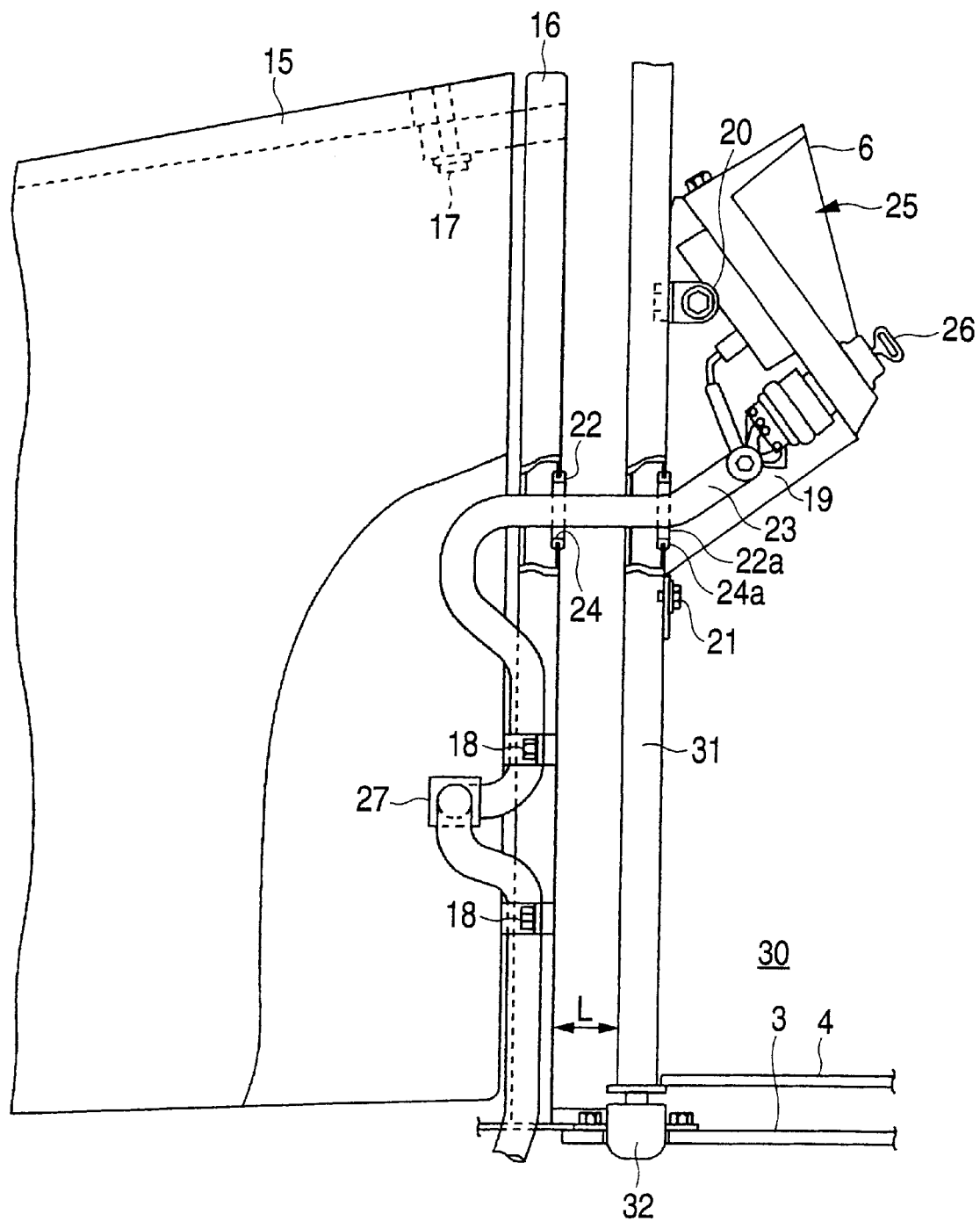
FIG. 2 is a schematic view of a console box mounting structure on the basis of an operator cab equipped specification.

In FIG. 2, the grommet 22 is fitted to the through hole 24 on the partition wall 16 of the engine room 15 in the same manner. An operator cab 30 is mounted to a vehicle frame 3 at the rear of the partition wall 16 via a vibration isolating mount apparatus 32, and a front surface wall 31 of the operator cab 30 is arranged so as to oppose to the partition wall 16 with a gap L having a predetermined distance. The console box 25 in which the same instrument panel 6 as that in the case of the operator cab non-equipped specification is placed is mounted on the front surface wall 31 of the operator cab 30. In this case, the same floor 4 as that in the case of the operator cab non-equipped specification is mounted to a lower surface portion of the operator cab 30.

A through hole 24a is pierced on the front surface wall 31 of the operator cab 30 at a posit-on having substantially the same height as that of the through hole 24. Further, a grommet 22a is fitted and attached to the through hole 24a. Further, the cable 23 obtained by collecting and combining the electric wiring of the instrument panel 6 is inserted within the engine room 15 via the grommet 22 of the partition wall 16 from the grommet 22a of the front surface wall 31, fixed to the side of the engine room of the partition wall 16 by the fixing means 18 so as not to move, and connected to the same connection connector 27 in the case of the operator cab non-equipped specification.

In this case, it is desirable that the respective through holes 24 and 24a on the partition wall 16 and the front surface wall 31 of the operator cab have the same diameter and are structured such that the cable 23 can be easily inserted thereto, however, as far as the center positions of the respective through holes 24 and 24a are set to be substantially the same and the cable 23 can be inserted to the respective through holes 24 and 24a, the diameters of the through holes 24 and 24a are not the same.

Figure 1:
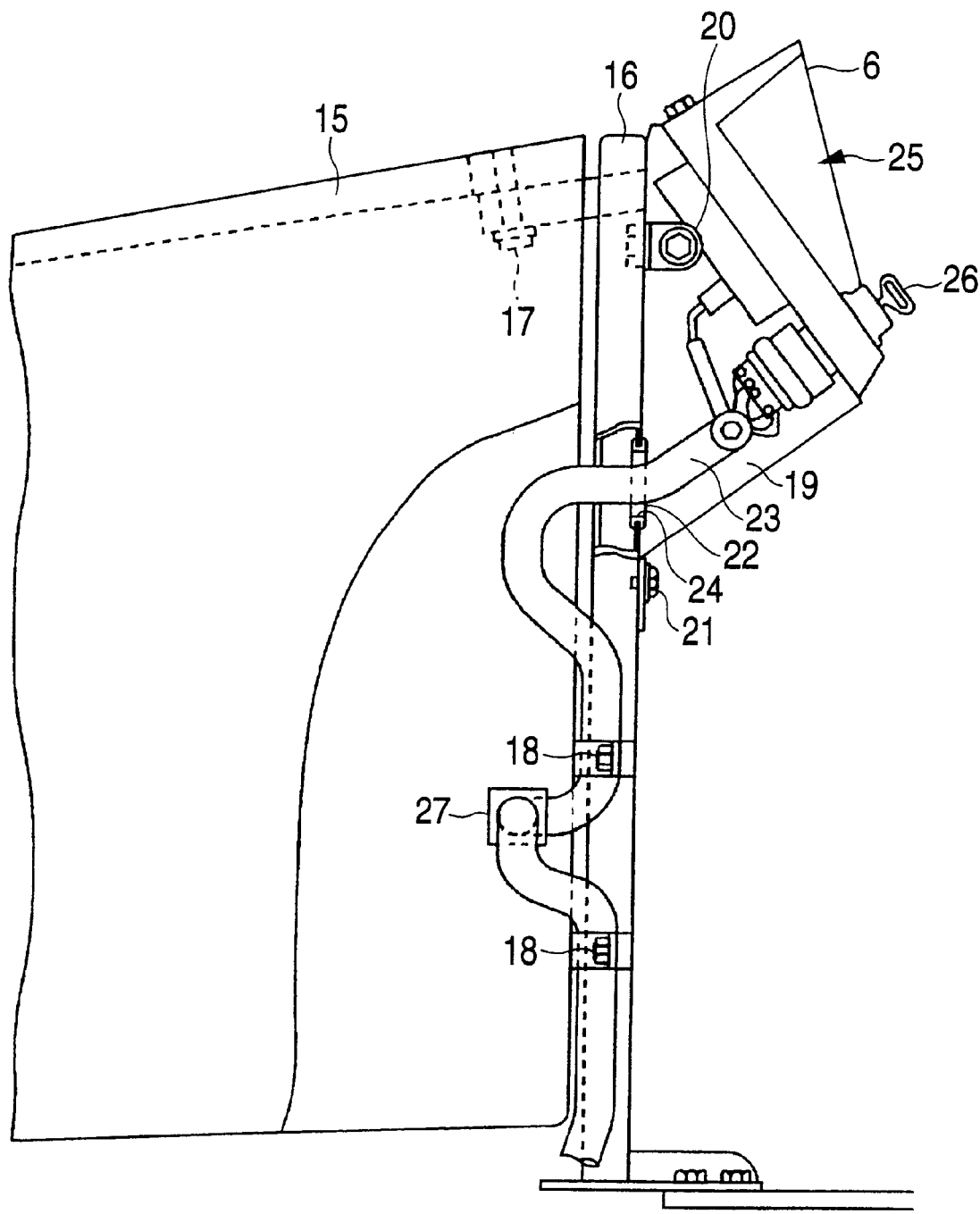
FIG. 1 is a schematic view of a console box mounting structure on the basis of an operator cab non-equipped specification.

In accordance with the embodiment described in FIGS. 1 and 2, the structure is made such that the console box 25 in which the same instrument panel 6 is placed can be attached to any one of the partition wall 16 of the engine room 15 and the front surface wall 31 of the operator cab 30. Accordingly, it is possible to commonly use the bracket 19, the detachable mounting means 20 and 21 of the instrument panel 6, the through hole 24, the grommet 22, the cable 23 and the console box 25. Further, since the through hole 24 provided on the partition wall 16 of the engine room 15 is aligned with the through hole 24a provided on the front surface wall 31 of the operator cab 30 in view of the position and the diameter, the wiring cable 23 of the same console box 25 can be commonly used in both of the operator cab equipped specification and the operatorcab non-equipped specification. Accordingly, since it is possible to use the same console box 25, the manufacturing cost can be reduced.

Further, in the case of changing the specification between the operator cab equipped specification and the operator cab non-equipped specification on the basis of the desire of the customer side after the construction vehicle is shipped, it can be executed only by replacing the console box 25 in which the instrument panel 6 is placed, and the original parts can be used without being wasted, so that it is possible to reduce the specification changing cost.

Further, in the case of the operator cab equipped specification, since the notch portion 7b on the front surface wall 7a of the operator cab 7 provided in the prior art is not required, it is possible to form the front surface wall side in the sealed structure, so that it is possible to improve a sealing performance of the operator cab 30. Accordingly, it is possible to improve an air conditioning performance performed by an air conditioner, a dust proof performance and a sound insulating performance and an interior comfort can be improved.

In this case, the embodiment of the console box mounting structure in accordance with the present invention is described on the basis of the bulldozer, however, it goes without saying that the present invention can be applied to the other construction vehicle such as a dozer shovel or the like and an industrial vehicle.

What is claimed is:

1. A console box and a mounting structure for the console box, which comprises:

the console box including an instrument panel with a start switch adapted for first and second vehicles, the first vehicle without an operator cab and the second vehicle including an operator cab; and the mounting structure adapted to directly and permanently fasten the console box to the first vehicle and the second vehicle, the mounting structure being adapted to mount the console box on a wall partitioning an engine room and an operator area of the first vehicle, and the mounting structure being adapted to mount the console box on a front surface wall of the operator cab in the second vehicle, wherein the mounting structure adapted to directly and permanently fasten the console box to the first vehicle and the second vehicle is identical.

2. The console box and a mounting structure for the console box as claimed in claim 1, wherein the console box includes a cable adapted to pass through a hole in the partition wall of the first vehicle without an operator cab and to pass through a hole in the front surface wall of the second vehicle.

* * * * *